United States Patent
Kim

(10) Patent No.: US 9,588,278 B2
(45) Date of Patent: Mar. 7, 2017

(54) LIQUID CRYSTAL DISPLAY APPARATUS

(71) Applicant: LG Display Co., Ltd., Seoul (KR)

(72) Inventor: NamSu Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/836,891

(22) Filed: Aug. 26, 2015

(65) Prior Publication Data

US 2016/0091654 A1 Mar. 31, 2016

(30) Foreign Application Priority Data

Sep. 30, 2014 (KR) ........................ 10-2014-0130925

(51) Int. Cl.
*G02F 1/1335* (2006.01)
*F21V 8/00* (2006.01)
*G02F 1/1362* (2006.01)

(52) U.S. Cl.
CPC ......... *G02B 6/0053* (2013.01); *G02B 6/0051* (2013.01); *G02F 1/136286* (2013.01)

(58) Field of Classification Search
CPC ............ G02F 1/133615; G02B 6/0038; G02B 6/0053
USPC ............................. 349/65; 362/615, 620, 626
See application file for complete search history.

(56) References Cited

U.S. PATENT DOCUMENTS

| | | | | |
|---|---|---|---|---|
| 5,552,907 A | * | 9/1996 | Yokota | F21V 5/04 349/112 |
| 5,600,455 A | * | 2/1997 | Ishikawa | F21V 5/02 349/57 |
| 2005/0099823 A1 | * | 5/2005 | Choi | G02B 6/0038 362/561 |
| 2012/0105757 A1 | * | 5/2012 | Lee | G02F 1/13452 349/42 |

* cited by examiner

*Primary Examiner* — Thanh-Nhan P Nguyen
(74) *Attorney, Agent, or Firm* — Fenwick & West LLP

(57) ABSTRACT

A liquid crystal display apparatus is provided. The liquid crystal display apparatus according to an exemplary embodiment of the present disclosure includes: a backlight; a liquid crystal display panel; and a light collecting layer. The liquid crystal display panel includes a first scan line and a second scan line crossing the first scan line. The light collecting layer is configured to collect lights from the backlight and guide the lights toward the liquid crystal display panel. Further, the light collecting layer includes: a first light collecting sheet having a plurality of light collecting structures extended in a first direction; and a second light collecting sheet disposed on the first light collecting sheet and having a plurality of light collecting structures extended in a second direction orthogonal to the first direction. Herein, the first direction is inclined with respect to an extension direction of the scan line.

14 Claims, 7 Drawing Sheets

LIQUID CRYSTAL DISPLAY APPARATUS

CROSS-REFERENCE TO RELATED APPLICATIONS

This application claims the priority of Korean Patent Application No. 10-2014-0130925 filed on Sep. 30, 2014, in the Korean Intellectual Property Office, the disclosure of which is incorporated herein by reference.

BACKGROUND

Field

The present disclosure relates to a liquid crystal display apparatus, and more particularly, to a liquid crystal display apparatus including a light collecting layer capable of minimizing a moire phenomenon of the liquid crystal display apparatus.

Description of the Related Art

A liquid crystal display apparatus refers to a display apparatus including a liquid crystal display panel in which a liquid crystal layer is provided. The liquid crystal display apparatus is driven by adjusting a transmittance of the liquid crystal display panel with respect to light from a light source such as a backlight unit. In recent years, demand for a liquid crystal display apparatus with a higher resolution has increased.

A light collecting layer including a prism structure is disposed between the liquid crystal display panel and the backlight unit. The light collecting layer is configured to increase a utilization efficiency ratio between light transmitted toward the liquid crystal display panel and light emitted from the backlight unit. The light collecting layer includes a plurality of light collecting structures in order to collect the light emitted from the backlight in a direction toward the liquid crystal display panel. The plurality of light collecting structures has a mountain shape or a triangular shape in a cross-sectional view. Light from the backlight is refracted on a surface of the light collecting structure in a direction toward the liquid crystal display panel. Thus, more light from the backlight unit proceeds to the liquid crystal display panel, so that the utilization efficiency of the light emitted from the backlight unit is increased. As the utilization efficiency of the lights from the backlight unit is increased, the luminance of the liquid crystal display apparatus may be increased.

However, in a liquid crystal display apparatus using a light collecting layer in order to increase the utilization efficiency of light, cyclically repeated light collecting structures of the light collecting layer and cyclically repeated pixel structures of the liquid crystal display panel may be overlapped. Thus, a moire phenomenon that causes a stripe-shaped bright/dark spot pattern may be generated. Since the moire phenomenon deteriorates the quality of a liquid crystal display apparatus, various methods have been studied in order to solve such a problem.

For example, a method has been studied in which a distance between the cyclically repeated light collecting structures of the light collecting layer is set to be smaller than a distance between sub-pixels. Thus, stripes caused by a moire phenomenon cannot be recognized with the naked eye. Further, a method has been studied in which a light collecting structure is configured as a combination of curved shapes, so that the light collecting structures cannot be cyclically repeated.

However, as a liquid crystal display panel is required to have a higher resolution, the method in which a distance between light collecting structures is set to be smaller than a distance between sub-pixels became not efficient in terms of cost and process since it requires manufacture of light collecting structures with small separation distances. Further, when a light collecting structure is configured as a combination of curved shapes, it is difficult to maximize the utilization efficiency of light and a localized moire phenomenon may be caused by a pattern of curved shapes.

SUMMARY

When a pixel pattern of a liquid crystal display panel and a pattern of a light collecting structure are completely identical to each other in angle, a moire phenomenon should not be generated. However, the inventors of the present disclosure recognized that even if a pixel pattern of a liquid crystal display panel and a pattern of a light collecting structure are designed to be completely identical with each other in angle, the pixel pattern and the pattern of the light collecting structure may not be completely identical with each other in angle due to a process error. After the pixel pattern and the pattern of the light collecting structure are designed to be completely identical with each other in angle, if the two patterns are different from each other in angle due to a process error, a moire phenomenon is generated. Further, a distance between stripes caused by the moire phenomenon is increased, so that the moire stripes can be easily recognized with the naked eye.

Further, the inventors of the present disclosure recognized that since a liquid crystal display panel is designed to have a high resolution, a moire phenomenon can be more easily observed even with a minute process error.

Accordingly, the inventors of the present disclosure invented a new liquid crystal display apparatus capable of minimizing a moire phenomenon by designing a pattern of a light collecting structure to be different from a pixel pattern of a liquid crystal display panel.

Accordingly, an objective of the present disclosure is to provide a liquid crystal display apparatus having a new structure capable of minimizing a moire phenomenon of the liquid crystal display apparatus while maximizing the utilization efficiency of light from a light source.

Further, another objective of the present disclosure is to provide a liquid crystal display apparatus having a structure in which a moire phenomenon cannot be recognized even when a liquid crystal display panel is designed to have a high resolution and a process error is generated.

The objects of the present disclosure are not limited to the aforementioned objects, and other objects, which are not mentioned above, will be apparent to a person having ordinary skill in the art from the following description.

According to an aspect of the present disclosure, a liquid crystal display apparatus is provided including: a backlight; a liquid crystal display panel; and a light collecting layer. The liquid crystal display panel includes pixels defined by a plurality of lines crossing each other. The light collecting layer is configured to collect light from the backlight in a direction toward the liquid crystal display panel and includes a prism mountain aligned in a grid array. Further, an angle between an extension direction of the prism mountain aligned in a grid array and an extension direction of each of the plurality of lines is determined to be an angle at which a moire phenomenon caused by a repeated pattern of the pixels is not recognized. With the above-described configuration of the liquid crystal display apparatus according to an exemplary embodiment of the present disclosure, a cycle of a repeated moire stripe is reduced, so that moire stripes cannot be distinguished with the naked eye. Therefore, in the liquid crystal display apparatus according to an exemplary embodiment of the present disclosure, a moire phenomenon may not be recognized.

According to another feature of the present disclosure, the light collecting layer includes a plurality of light collecting sheets. Further, an extension direction of a prism mountain of one of the plurality of light collecting sheets is perpendicular to an extension direction of a prism mountain of another one of the plurality of light collecting sheets.

According to yet another feature of the present disclosure, the extension direction of the prism mountain aligned in a grid array is inclined with respect to the extension direction of each of the plurality of lines.

According to still another feature of the present disclosure, the plurality of lines includes a scan line and a data line that define a pixel. Also, an angle between an extension direction of the scan line and the extension direction of the prism mountain aligned in a grid array and an angle between an extension direction of the data line and the extension direction of the prism mountain aligned in a grid array are in the range of 4 to 12 degrees or 94 to 102 degrees.

According to another aspect of the present disclosure, there is provided a liquid crystal display apparatus including: a backlight; a liquid crystal display panel; and a light collecting layer. The liquid crystal display panel includes a scan line and a scan line crossing the scan line. The light collecting layer is configured to refract the light from the backlight in a direction toward the liquid crystal display panel. Further, the light collecting layer includes: a first light collecting sheet having a plurality of light collecting structures extended in a first direction; and a second light collecting sheet on the first light collecting sheet and having a plurality of light collecting structures extended in a second direction orthogonal to the first direction. Herein, the first direction is inclined with respect to an extension direction of the scan line.

According to another feature of the present disclosure, an angle between the first direction and the extension direction of the scan line is in the range of 4 to 12 or 94 to 102 degrees.

According to yet another feature of the present disclosure, the second direction is inclined with respect to an extension direction of the data line.

According to still another feature of the present disclosure, the extension direction of the data line is inclined with respect to the extension direction of the scan line.

According to still another feature of the present disclosure, an angle between the second direction and the extension direction of the data line is in the range of 4 to 12 degrees or 94 to 102 degrees.

According to still another feature of the present disclosure, the plurality of light collecting structures of the first light collecting sheet and the plurality of light collecting structures of the second light collecting sheet are orthogonal to each other.

According to still another feature of the present disclosure, the plurality of light collecting structures has a triangular prism structure in a cross-sectional view.

According to still another feature of the present disclosure, the light collecting layer further includes a scattering layer between the first light collecting sheet and the second light collecting sheet.

According to still another feature of the present disclosure, the light collecting layer further includes a scattering layer on the first light collecting sheet or under the second light collecting sheet.

According to still another feature of the present disclosure, the scattering layer includes a plurality of scattering particles.

According to still another feature of the present disclosure, the scattering layer of the light collecting layer is configured to have a haze of 90% or more in the light collecting layer.

According to yet another aspect of the present disclosure, a liquid crystal display apparatus is provided including: a liquid crystal display panel including a plurality of lines and pixels; and a light collecting layer configured to collect lights from a backlight in a direction toward the liquid crystal display panel and including a prism mountain aligned in a grid array. Herein, the prism mountain has a shape extended in a direction in which a pixel array is not matched to a grid array.

According to another feature of the present disclosure, the prism mountain aligned in a grid array is extended in a direction inclined with respect to an extension direction of the plurality of lines. Thus, interference between the pixel array and the grid array is reduced.

According to yet another feature of the present disclosure, the light collecting layer includes a plurality of light collecting sheets. Further, grid arrays of a plurality of prism mountains included in the plurality of light collecting sheets are orthogonal to each other.

According to still another feature of the present disclosure, the light collecting layer further includes a scattering layer so as to further reduce interference between the pixel array and the grid array by relieving a regular grid array of the prism mountains.

Details of other exemplary embodiments will be included in the detailed description of the disclosure and the accompanying drawings.

According to the present disclosure, due to a new structure of a liquid crystal display apparatus, a distance between moire stripes is reduced so as not to be recognized with the naked eye. Thus, the quality of the liquid crystal display apparatus is improved.

Further, according to the present disclosure, a pixel pattern of a liquid crystal display panel and a pattern of a light scattering structure of a light scattering layer are disposed so as not to be matched to each other. Thus, generation of a recognizable moire stripe is suppressed which may be caused by a process error when the two patterns are disposed to be matched to each other.

The effects of the present disclosure are not limited to the aforementioned effects, and other various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
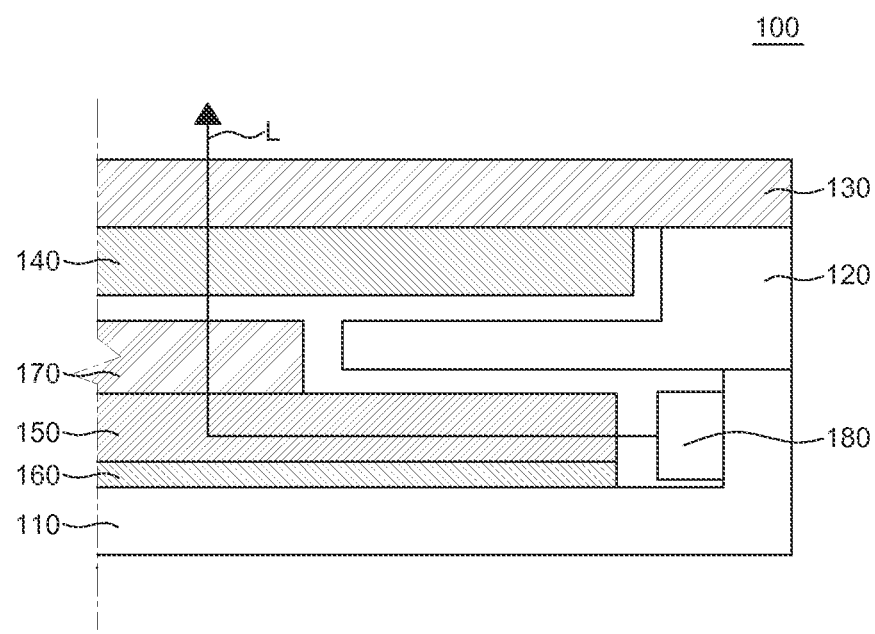
FIG. 1 is a schematic cross-sectional view of a liquid crystal display apparatus according to an exemplary embodiment of the present disclosure.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like shown in the accompanying drawings for describing the exemplary embodiments of the present disclosure are merely examples, and the present disclosure is not limited thereto. Like reference numerals generally denote like elements throughout the present specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", "next" and the like, one or more parts may be positioned between the two parts unless the terms are used with the term "immediately" or "directly".

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways as can be fully understood by a person having ordinary skill in the art, and the embodiments can be carried out independently of or in association with each other.

Hereinafter, various exemplary embodiments of the present disclosure will be described in detail with reference to the accompanying drawings.

FIG. 1 is a schematic cross-sectional view of a liquid crystal display apparatus according to embodiment of the present disclosure. Referring to FIG. 1, a liquid crystal display apparatus 100 includes a liquid crystal display panel 140, a transparent plate 130, a first chassis 120, a second chassis 110, a backlight 180, a light guide plate 150, a reflective plate 160, and a light collecting layer 170.

Referring to FIG. 1, the liquid crystal display panel 140 is a display panel configured to adjust an amount of transmitted light L from the backlight 180 by aligning a liquid crystal and allowing the transmitted light L to pass through a color filter so as to realize a color. Although not illustrated in the drawing, the liquid crystal display panel 140 includes a plurality of transistors, lines for supplying various signals and a voltage to the plurality of transistors, and a liquid crystal layer.

The transparent plate 130 bonded to a top side of the liquid crystal display panel 140 is disposed on the liquid crystal display panel 140. The transparent plate 130 is bonded to the liquid crystal display panel 140. The transparent plate 130 may be formed of a flexible material such as glass or polyimide. However, the liquid crystal display apparatus 100 according to an exemplary embodiment of the present disclosure is not limited to the liquid crystal display apparatus 100 in which the liquid crystal display panel 140 is bonded to the transparent plate 130 as illustrated in FIG. 1. However, it may be the liquid crystal display apparatus 100 including a cover part configured to fix a liquid crystal display panel by fixing a part of the liquid crystal display panel 140. The liquid crystal display apparatus 100 including a cover part is formed such that the liquid crystal display panel 140 is exposed to the outside. The liquid crystal display panel 140 has a resolution of, for example, 200 ppi, or UHD (ultra high definition) or more. If the liquid crystal display panel 140 has a high resolution, a pixel pattern of the liquid crystal display panel 140 becomes gradually miniaturized. Therefore, it becomes more difficult to match an angle of the miniaturized pixel pattern to an angle of a light collecting pattern of the light collecting layer 170, and the mismatched pixel pattern and light collecting pattern may cause a moire phenomenon. In the liquid crystal display apparatus 100 according to an exemplary embodiment of the present disclosure, even if the high-resolution liquid crystal display panel 140 is employed, a moire pattern caused by a moire phenomenon cannot be recognized with the naked eye.

The first chassis 120 is disposed outside the liquid crystal display panel 140. The first chassis 120 protects the liquid crystal display apparatus 100 by suppressing the introduction of foreign substances from a lateral side of the liquid crystal display apparatus 100. The first chassis 120 may be formed of, for example, a plastic material in order to suppress a short circuit with the other components. The second chassis 110 is disposed under the first chassis 120. The second chassis 110 reduces the introduction of foreign substances from a bottom side of the liquid crystal display apparatus 100 and protects the liquid crystal display apparatus 100 against a shock or the like. The second chassis 110 is configured to be extended toward the first chassis 120 such that the backlight 180 can be disposed on an inner lateral side of the second chassis 110.

The first chassis 120 and the second chassis 110 are not limited to the structure as illustrated in FIG. 1, but may have a structure configured to support various components depending on a design. For example, a top side or a bottom side of the second chassis 110 may be protruded in part depending on a design. Further, if the second chassis 110 is formed of metal, a part of the second chassis 110 may be insulated in order to suppress an electrical connection with the other components.

The backlight 180 is operated as a light at a lateral side of the liquid crystal display apparatus 100 and under the liquid crystal display panel 140. The backlight 180 may include a light source such as an LED (light emitting diode).

The light guide plate 150 is disposed on a lateral side of the backlight 180. The light guide plate 150 is a component configured to guide the light L in order for the light L from the backlight 180 to be uniformly irradiated in a direction in which the liquid crystal display panel 140 is disposed. The light L from the backlight 180 is incident into the light guide plate 150 and then is uniformly irradiated toward the liquid crystal display panel 140 based on a light emitting structure such as a surface light collecting structure within the light guide plate 150.

The reflective plate 160 is disposed under the light guide plate 150. The reflective plate 160 reflects light toward the liquid crystal display panel 140. The reflected light passes through the light guide plate 150 from the backlight 180. The reflective plate 160 is a plate formed of a metal having a high reflectivity or an alloy of various metals.

The light collecting layer 170 configured to transmit the light L from the light guide plate 150 is disposed on the light guide plate 150. The light collecting layer 170 may be composed of optical layers configured to perform various optical functions and disposed on the light guide plate 150. The light collecting layer 170 enables a light passing through the light guide plate 150 from the backlight 180 to be concentrated toward the liquid crystal display panel 140. Therefore, more light L from the light guide plate 150 passes through the light collecting layer 170 and then proceeds toward the liquid crystal display panel 140. Thus, the overall luminance of the liquid crystal display apparatus 100 is increased. Although not illustrated in FIG. 1, a scattering layer configured to scatter the light L may be disposed on the light guide plate 150.

The light collecting layer 170 includes two light collecting sheets. The light collecting layer 170 including two light collecting sheets will be described in more detail with reference to FIG. 2.

Figure 2:
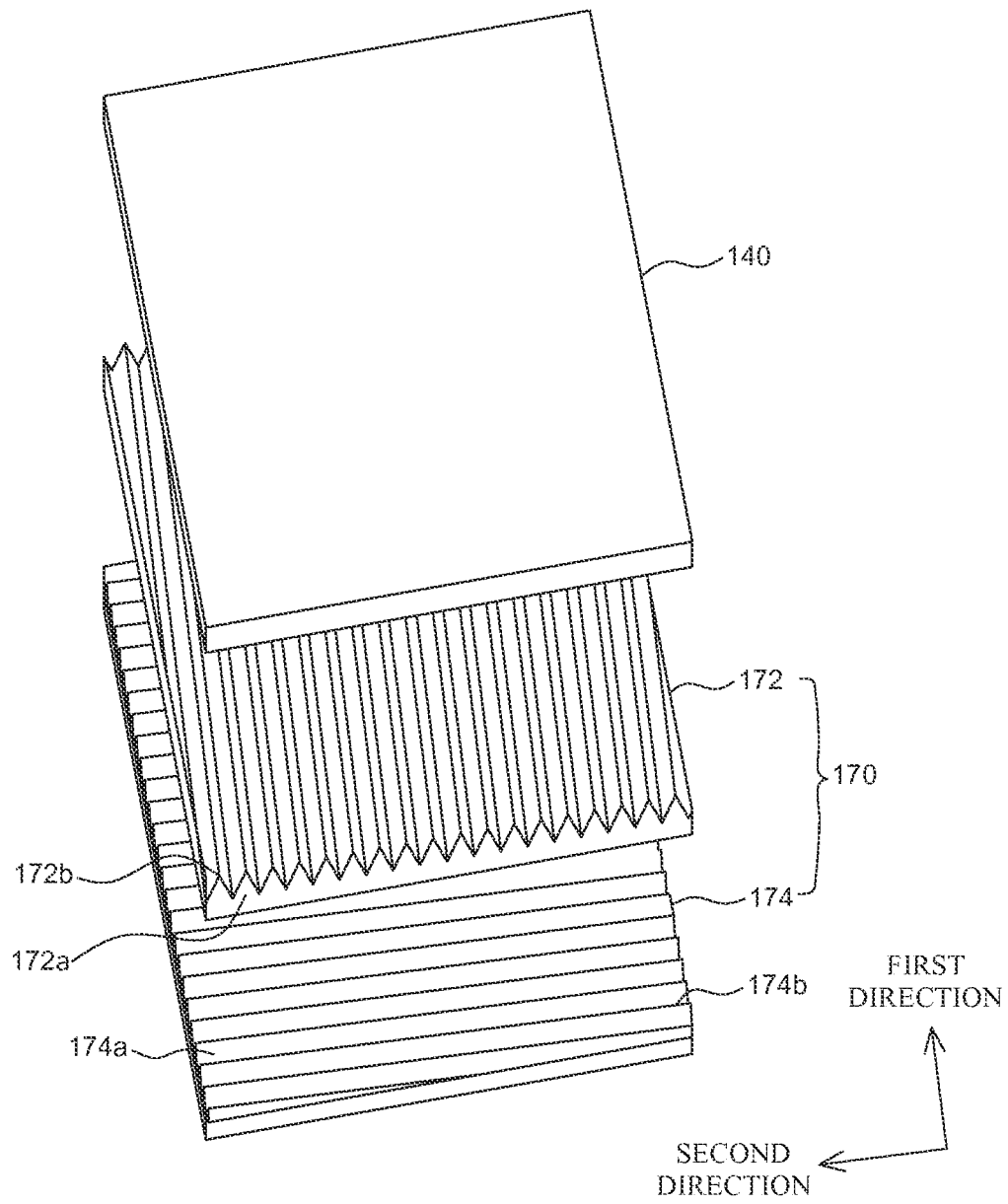
FIG. 2 is a schematic exploded perspective view of a liquid crystal display apparatus according to an exemplary embodiment of the present disclosure.

FIG. 2 is a schematic exploded perspective view of a liquid crystal display apparatus according to an exemplary embodiment of the present disclosure. For convenience in explanation, FIG. 2 illustrates only the liquid crystal display panel 140 and the light collecting layer 170 including a first light collecting sheet 172 and a second light collecting sheet 174 among various components of the liquid crystal display apparatus 100 illustrated in FIG. 1.

The first light collecting sheet 172 and the second light collecting sheet 174 include a plurality of light collecting structures 172a and 174a, respectively. Each of the light collecting structures 172a and 174a of the first light collecting sheet 172 and the second light collecting sheet 174 function as a prism. In order to do so, the light collecting structures 172a and 174a are formed cyclically on the first light collecting sheet 172 and the second light collecting 174, respectively. Each of the plurality of light collecting structures 172a of the first light collecting sheet 172 is extended in a first direction, and the light collecting structures 172a are formed to be parallel with each other. Each of the plurality of light collecting structures 174a of the second light collecting sheet 174 is extended in a second direction orthogonal to the first direction. Further, the light collecting structures 174a are formed to be parallel with each other.

To be more specific, the light collecting structures 172a and 174a of the first light collecting sheet 172 and the second light collecting sheet 174 are formed into an inverted V-shape. That is, the light collecting structures 172a and 174a of the first light collecting sheet 172 and the second light collecting sheet 174 have a triangular prism shape or a prism mountain in a cross-sectional view. Further, top lines 172b and 174b of the inverted V-shapes and bottom lines of the V-shaped grooves are formed to be alternately disposed. Further, the top lines 172b of the light collecting structures 172a of the first light collecting sheet 172 are orthogonal to the top lines 174b of the of the light collecting structures 174a of the second light collecting sheet 174. Likewise, the bottom lines of the light collecting structures 172a of the first light collecting sheet 172 are orthogonal to the bottom lines of the light collecting structures 174a of the second light collecting sheet 174. The top lines 172b and the bottom lines of the light collecting structures 172a of the first light collecting sheet 172 are parallel with an extension direction of the light collecting structures 172a. Also, the top lines 174b and the bottom lines of the light collecting structures 174a of the second light collecting sheet 174 are parallel with an extension direction of the light collecting structures 174a.

Lights incident into the first light collecting sheet 172 and the second light collecting sheet 174 from various directions are refracted on surfaces of the light collecting structures 172a and 174a in a direction toward the liquid crystal display panel 140. Since the extension direction of the light collecting structures 172a of the first light collecting sheet 172 is orthogonal to the extension direction of the light collecting structures 174a of the second light collecting sheet 174, the light L incident in a direction inclined with respect to the first direction and the second direction can be refracted in a direction toward the liquid crystal display panel 140. Therefore, the light collecting layer 170 includes the first light collecting sheet 172. Further, the second light collecting sheet 174 enables most of the light L having non-uniform incident angles with respect to the light collecting layer 170 to proceed toward the liquid crystal display panel 140.

The light collecting structures 172a of the first light collecting sheet 172 extended in the first direction of the liquid crystal display apparatus 100 according to an exemplary embodiment of the present disclosure are disposed to be inclined with respect to a long side of the liquid crystal display panel 140. Referring to FIG. 2, the extension direction of the light collecting structures 172a of the first light collecting sheet 172 is neither parallel with nor orthogonal to the long side of the liquid crystal display panel 140. However, it is inclined with respect to the long side the liquid crystal display panel 140. Further, the extension direction of the light collecting structures 174a of the second light collecting sheet 174 is orthogonal to the extension direction of the light collecting structures 172a of the first light collecting sheet 172. Thus, the extension direction of the light collecting structures 174a of the second light collecting sheet 174 is inclined with respect to the long side of the liquid crystal display panel 140 in the same manner.

In other words, the prism mountain of the first light collecting sheet 172 or the second light collecting sheet 174 may have a shape extended in a direction in which a pixel array is not matched to a grid array. Further, the prism mountains of the light collecting sheets 172 and 174 aligned in a grid array are extended in a direction inclined with respect to an extension direction of the plurality of lines so as to reduce interference between the pixel array and the grid array.

Further, the long side of the liquid crystal display panel 140 may be parallel with one of the lines of the liquid crystal display panel 140. Thus, an extension direction of a light collecting structure may be inclined with respect to the long side of the liquid crystal display panel 140, which means that an extension direction of a light collecting structure may be inclined with respect to one of the lines of the liquid crystal display panel 140. The extension direction of the lines of the liquid crystal display panel 140 and the extension directions of the light collecting structures 172a and 174a of the first light collecting sheet 172 and the second light collecting sheet 174 will be described later with reference to FIG. 3.

Figure 3:
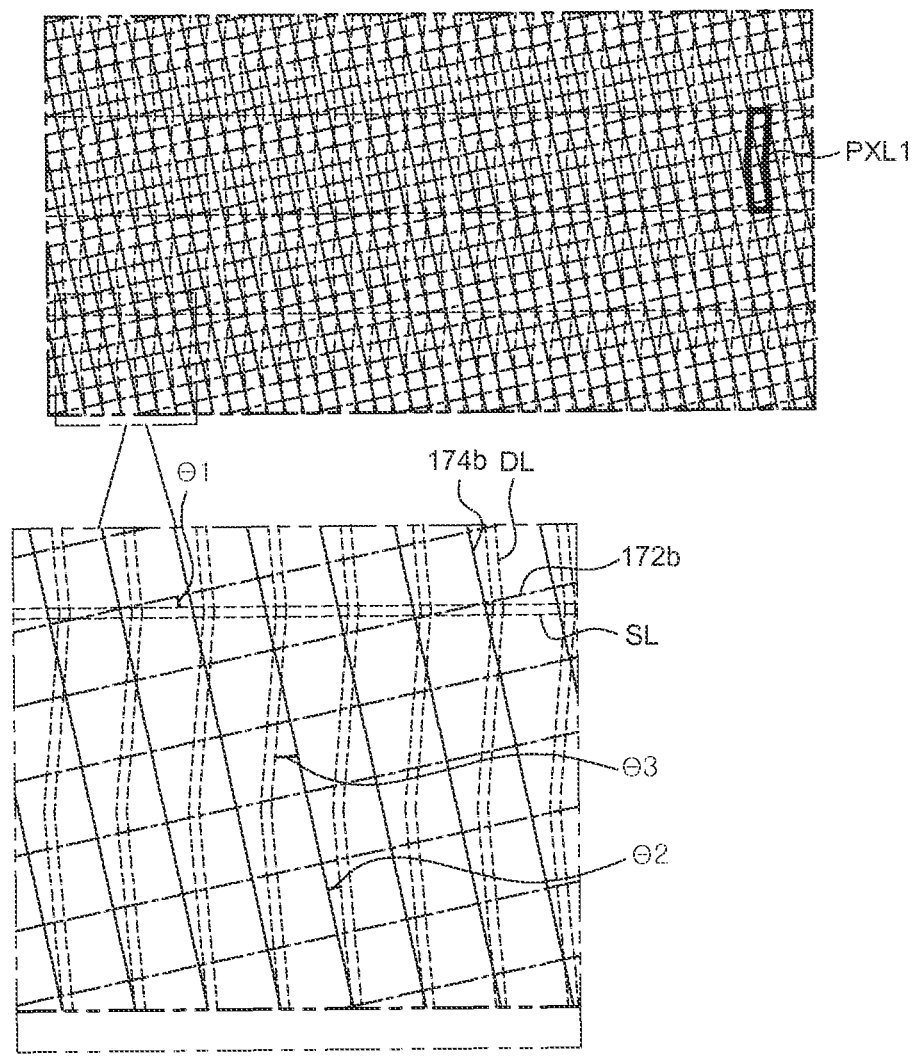
FIG. 3 is a schematic three-dimensional top view provided to explain a relationship between a liquid crystal display panel and a light collecting layer in a liquid crystal display apparatus according to an exemplary embodiment of the present disclosure.

FIG. 3 is a schematic three-dimensional top view provided to explain a relationship between a liquid crystal display panel and a light collecting layer in a liquid crystal display apparatus according to an exemplary embodiment of the present disclosure. FIG. 3 illustrates a sub-pixel region PXL1 of the liquid crystal display panel 140 illustrated in FIG. 2 and the top lines 172b and 174b of the light collecting structures 172a and 174a of the first light collecting sheet 172 and the second light collecting sheet 174 on one plane. For convenience in explanation, illustration of the other components is omitted.

Referring to a part of the liquid crystal display apparatus 100 enlarged in FIG. 3, the sub-pixel region PXL1 of the liquid crystal display panel may be defined by a scan line SL and a data line DL shown in dotted line. The scan line SL is extended in a horizontal direction. The data line DL is extended in a vertical direction and has a "<" shape inclined to the left at a central portion. To be specific, the data lines DL are inclined and extended from the facing scan lines SL at a corresponding angle. For example, the data line DL may be inclined at 80 to 89 degrees with respect to the scan line SL. Therefore, the data line DL may have a hexagonal shape partially inclined to the left at the center of the sub-pixel region PXL1.

In FIG. 3, the top lines 172b indicating the extension direction of the light collecting structures of the first light collecting sheet are shown in alternate long and short dash line. Further, the top lines 174b indicating the extension direction of the light collecting structures of the second light collecting sheet are shown in solid line. The top lines 172b of the first light collecting sheet are inclined as much as θ1 with respect to the scan line SL. θ1 as an angle between the first direction as the extension direction of the light collecting structures of the first light collecting sheet and the extension direction of the scan line SL is in the range of between 4 degrees and 49 degrees. If θ1 is less than 4 degrees, a cycle of a moire stripe caused by the light collecting structures of the first light collecting sheet and sub-pixel patterns is increased, so that moire stripes can be recognized with the naked eye. If θ1 is 49 degrees or more, an angle between the top line 172 and the data line DL is decreased, so that moire stripes can be recognized with the naked eye. Preferably, θ1 may be in the range of between 4 degrees and 12 degrees. Even if θ1 is in between 12 degrees and 49 degrees, moire stripes may not be recognized. However, if θ1 is more than 12 degrees, the area of a light collecting sheet to be discarded at the time of manufacturing the light collecting sheet is increased. Therefore, if θ1 is more than 12 degrees, the cost efficiency may be reduced.

A cycle of a moire stripe is determined by the following Equation 1.

$$P = \frac{p}{2\sin(\theta/2)} \quad \text{(Equation 1)}$$

Herein, P is a cycle of a moire stripe, p is a cycle of an overlapped line pattern, and θ is an angle between lines of two patterns. For convenience in explanation, it is assumed that the cycle of an overlapped line pattern is constant. According to Equation 1, as θ is closer to 0, P is increased, and as θ is increased, P is decreased. It is known that when P is 50 μm or more, a moire pattern can be recognized with the naked eye. When P is less than 50 μm, even if a moire pattern is generated, a pattern having a cycle of less than 50 μm cannot be recognized with the naked eye. Even if the cycle p is determined depending on a process or other factors, it is possible to minimize recognition of a moire pattern with the naked eye by adjusting θ and lowering P to a predetermined level or less.

Figure 4A:
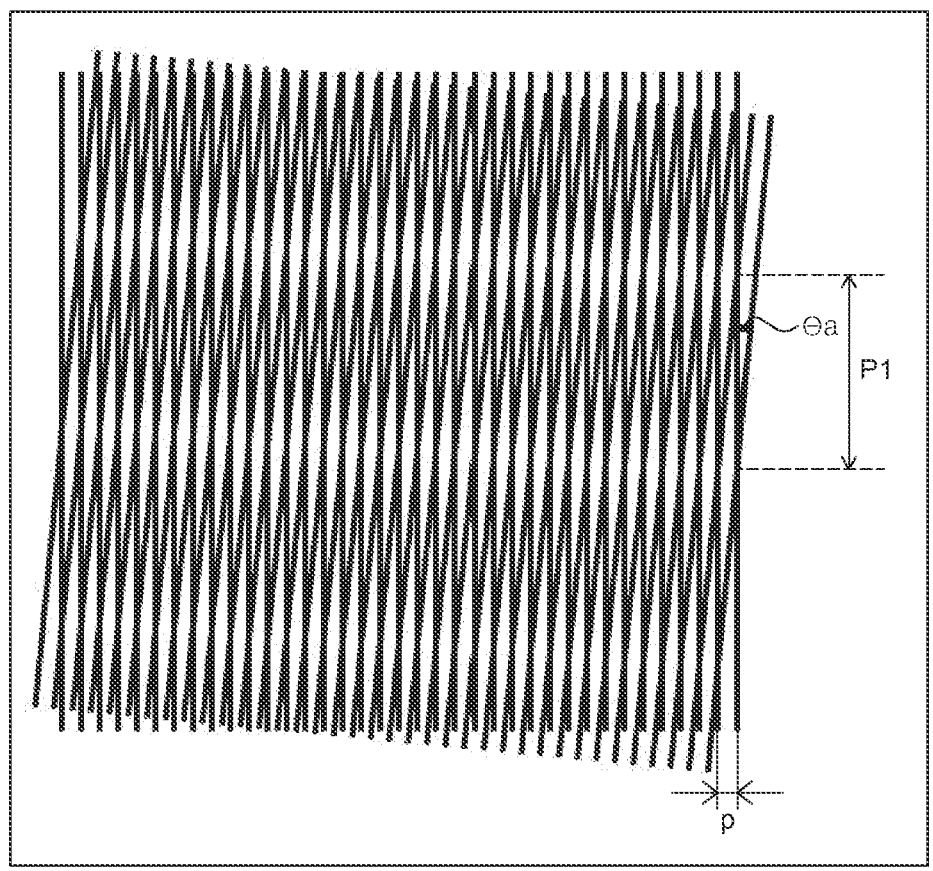
FIG. 4A and FIG. 4B are schematic diagrams provided to explain a change in cycle of a moire stripe.
Figure 4B:
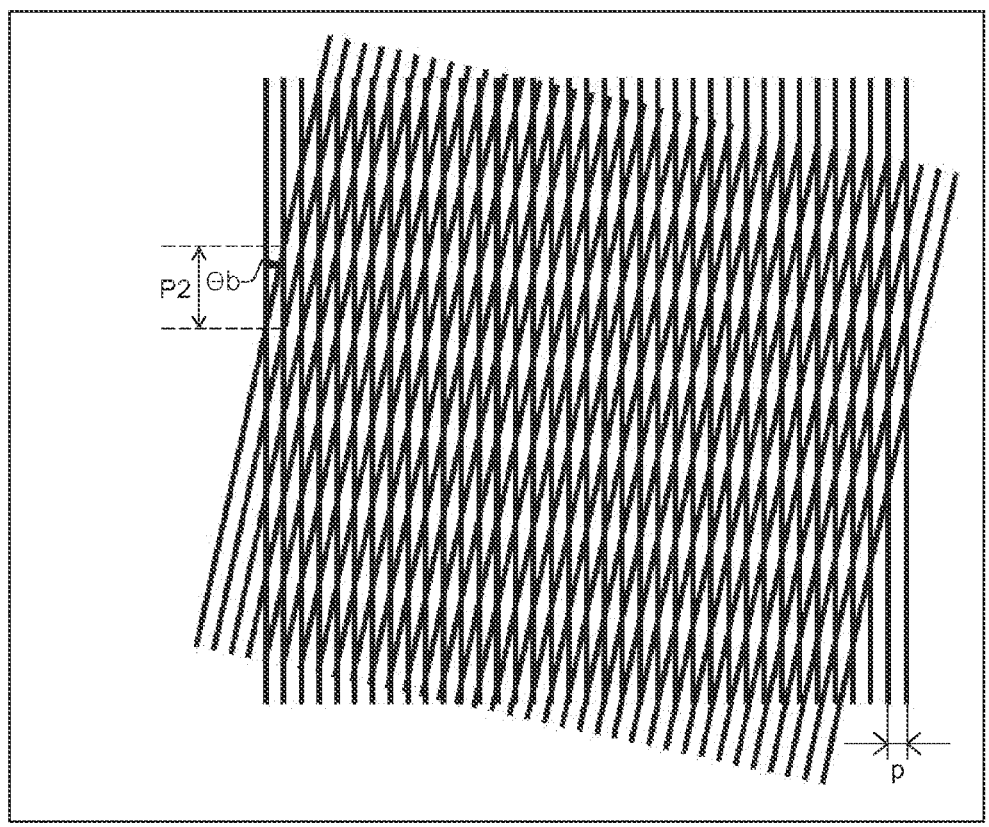

FIG. 4A to FIG. 4B are schematic diagrams provided to explain a change in cycle of a moire stripe. Referring to FIG. 4A first, FIG. 4A illustrates that two line patterns are overlapped. The two line patterns are inclined as much as θa, and each of the two patterns has lines disposed with the cycle p. Since the two line patterns are disposed to be inclined, a new pattern of moire stripes is generated having a cycle of P1. Although the cycle p of a pattern is illustrated as being constant for convenience in explanation, the cycle p can be set in various ways depending on a design of a pixel pattern and a light collecting pattern. Further, a cycle of the pixel pattern may not be identical with a cycle of the light collecting pattern.

Meanwhile, referring to FIG. 4B, FIG. 4B illustrates that two line patterns are inclined as much as θb greater than θa, and each of the two patterns has lines disposed with the cycle p in the same manner as shown in FIG. 4a. Likewise, since the two line patterns are disposed to be inclined, a new pattern is generated. The new pattern has a cycle of P2. The cycle P2 is shorter than the cycle P1, and if the cycle P2 becomes short enough, the new pattern may not be recognized with the naked eye.

That is, referring to FIG. 4a and FIG. 4b, if the cycle p is constant, the cycle patterns P1 and P2 of the moire stripes, generated when the two line patterns are overlapped, are determined by the angles θa and θb between the patterns, respectively. Further, if moire stripes have a long cycle, the moire stripes can be recognized with the naked eye. On the other hand, if moire stripes have a sufficiently short cycle, the moire stripes cannot be recognized with the naked eye. That is, an angle between an extension direction of a prism mountain aligned in a grid array and an extension direction of each of the plurality of lines is determined as an angle at which a moire phenomenon caused by a repeated pattern of pixels is not recognized.

Therefore, in the liquid crystal display apparatus 100 according to an exemplary embodiment of the present disclosure, an angle between the lines that define the sub-pixel and the extension directions of the light collecting structures of the first light collecting sheet and the second light collecting sheet is set to be 4 degrees or more. Thus, a cycle of moire stripes is reduced so as not to be recognized with the naked eye.

If a pattern of a light collecting structure of a light collecting sheet is designed to be matched to a pixel pattern in the same manner as the prior art, moire stripes having a considerably long cycle P may be generated due to a minute angle error during a process. If moire stripes having such a long cycle are recognized with the naked eye, the quality of an image displayed on the liquid crystal display apparatus 100 deteriorates.

However, in the liquid crystal display apparatus 100 according to an exemplary embodiment of the present disclosure, even if a minute angle error is generated during a process, an angle between the lines that define the sub-pixel and the extension directions of the light collecting structures of the first light collecting sheet and the second light collecting sheet is high enough. Therefore, there is no significant change in a cycle of moire stripes, and the cycle is short enough. Thus, the moire stripes are not recognizable by the naked eye.

Hereinafter, referring to FIG. 3 again, an angle relationship between the top lines 172b and 174b of the first light collecting sheet and the second light collecting sheet, respectively, and the other components will be described. In the liquid crystal display apparatus 100, moire stripes may be generated not only by the light collecting structures of the first light collecting sheet and the scan lines SL, but also by other lines and the first light collecting sheet or the second light collecting sheet. Therefore, it is possible to sufficiently reduce a moire phenomenon by setting the angle θ1 between the top line 172b of the first light collecting sheet and the scan line SL to at least 4 degrees. Also, it is possible to minimize a moire phenomenon by adjusting an angle between the other components.

In the liquid crystal display apparatus 100 according to an exemplary embodiment of the present disclosure, an angle between various components is determined such that moire stripes cannot be recognized. Referring to FIG. 3, the angle between the top line 174b of the second light collecting sheet and the data line DL, i.e., the angle θ2 between the second direction of the light collecting structure of the second light collecting sheet and the extension direction of the data line DL, may be in the range of 4 degrees or more and 49 degrees or less. The data line DL is not orthogonal to the scan line SL, but is inclined with respect to the scan line SL. However, in the liquid crystal display apparatus 100, the top line 172b of the first light collecting sheet may be orthogonal to the top line 174b of the second light collecting sheet in order to maximize refraction of light from the light collecting layer toward the liquid crystal display panel.

Further, an angle θ3 between the top line 174b of the second light collecting sheet and the data line DL may be between 4 degrees and 49 degrees. The data line DL is not extended straight, but is bent at a point. Therefore, when an angle between the top line 174b of the second light collecting sheet and the data line DL is determined, a bending direction of the data line DL is also taken into consideration.

The following Table 1 shows how much moire stripes are recognized when an extension direction of light collecting structures of a light collecting layer in the liquid crystal display apparatus 100 is inclined with respect to an extension direction of lines of the liquid crystal display panel. The first light collecting sheet and the second light collecting sheet in the light collecting layer were inclined at angles as shown in Table 1 with respect to the liquid crystal display panel illustrated in FIG. 3, and levels of recognition of moire stripes were measured. Further, an angle was indicated with reference to the angle between the top line 172b of the first light collecting sheet and the scan line SL. A level of recognition of moire stripes was indicated as 0 when no moire stripe was recognized and a level of recognition of moire stripes when the angle between the top line 172b of the first light collecting sheet and the scan line SL is 0 degrees was indicated as 10.

TABLE 1

| Angle (Degree) | Level of recognition of moire stripes |
| --- | --- |
| 0 | 10 |
| 2 | 8 |
| 4 | 5 |
| 6 | 3 |
| 8 | 1 |
| 10 | 0 |
| 12 | 0 |

Referring to Table 1, when the angle between the top line 172b of the first light collecting sheet and the scan line SL is 0 degree, the most moire stripes are recognized. The most moire stripes are recognized at the 0-degree angle because moire stripes having a long cycle are generated due to a process error as described above.

, Recognition of moire stripes is remarkably decreased even if the angle is 4 degrees. The reason for such a decrease may be because that a cycle of a moire stripe is decreased due to an increased angle between the top line 172b of the first light collecting sheet and the scan line SL. Thus, a moire strip cannot be recognized with the naked eye. However, the reason why a moire stripe is still recognized may be because of a moire stripe caused by the light collecting structure of the second light collecting sheet and the data line DL.

If the angle is 8 degrees or more, moire stripes are substantially not recognized. The moire stripes caused by the light collecting structure of the first light collecting sheet and the scan line SL already have an unrecognizable cycle. Further, since the angle between the light collecting structure of the second light collecting sheet and the data line DL is increased, a cycle of a moire stripe caused by them is decreased. Therefore, the moire stripe caused by the light collecting structure of the second light collecting sheet and the data line DL may not be recognized with the naked eye.

If the moire stripes caused by the light collecting structures of the first light collecting sheet and the second light collecting sheet and the lines have a sufficiently short cycle and thus cannot be recognized with the naked eye, the angle may be 12 degrees or more. For example, θ1, θ2, or θ3 may be in the range of 94 degrees to 139 degrees, 221 degrees to 266 degrees (−94 degrees to −139 degrees), or 311 degrees to 356 degrees (−4 degrees to −49 degrees).

In the liquid crystal display apparatus 100 according to an exemplary embodiment of the present disclosure, as illustrated in FIG. 2 and FIG. 3, the light collecting structures of the first light collecting sheet and the second light collecting sheet are inclined with respect to the lines, so that moire stripes caused by them are not recognizable. Thus, the quality of images displayed on the liquid crystal display apparatus 100 can be improved. Further, the convex-concave structures of the first light collecting sheet and the second light collecting sheet maintain a vertical relationship, so that a light collecting effect can be maintained.

Figure 5:
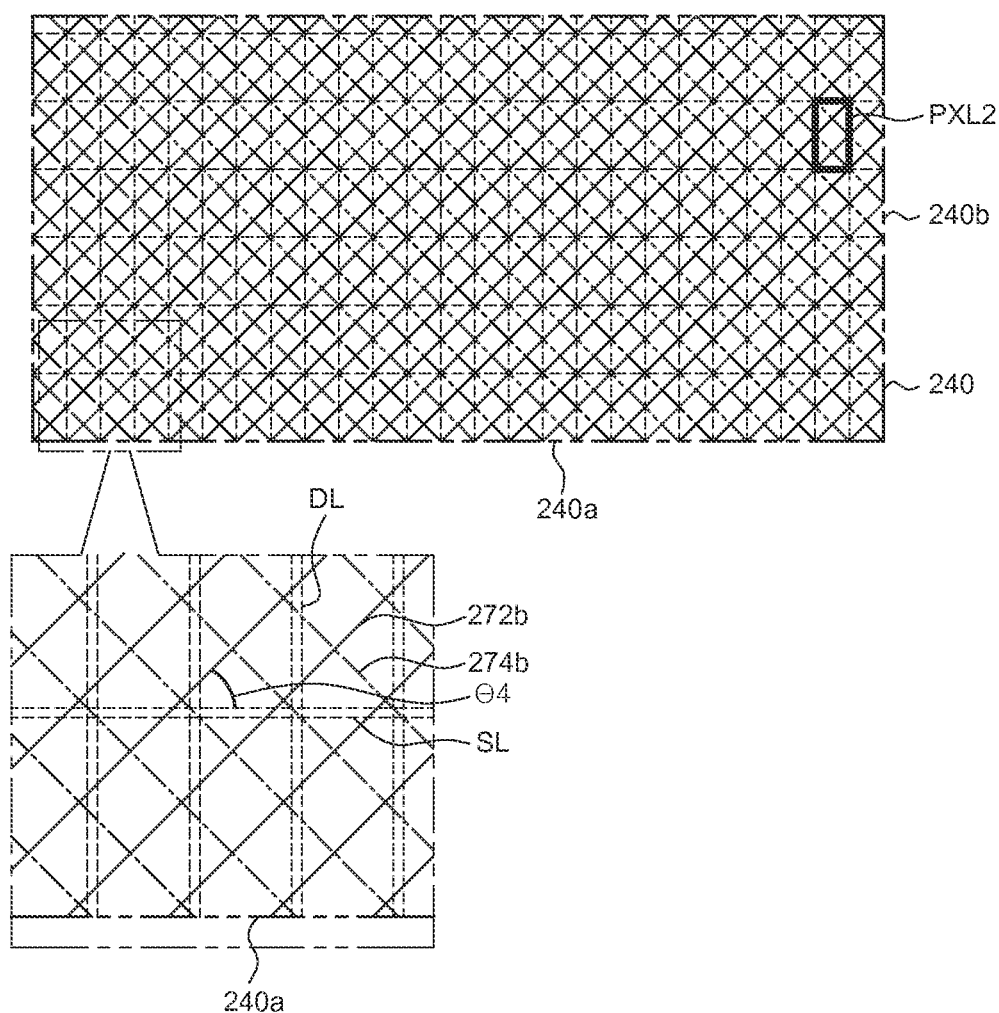
FIG. 5 is a schematic three-dimensional top view provided to explain a relationship between a liquid crystal display panel and a light collecting layer in a liquid crystal display apparatus according to another exemplary embodiment of the present disclosure.

FIG. 5 is a schematic three-dimensional top view provided to explain a relationship between a liquid crystal display panel and a light collecting layer in a liquid crystal display apparatus according to another exemplary embodiment of the present disclosure. In the same manner as illustrated in FIG. 3, FIG. 5 illustrates a sub-pixel region PXL2 of a liquid crystal display panel 240 and top lines 272b and 274b of light collecting structures of a first light collecting sheet and a second light collecting sheet on one plane. The other components are substantially the same as illustrated in the cross-sectional view of FIG. 3. Therefore, redundant description thereof will be omitted. In FIG. 5, the top lines 272b indicating an extension direction of the light collecting structures of the first light collecting sheet are shown in solid line and the top lines 274b indicating an extension direction of the light collecting structures of the second light collecting sheet are shown in alternate long and short dash line.

In FIG. 5, the liquid crystal display panel 240 of a liquid crystal display apparatus 200 has a rectangular shape. The liquid crystal display panel 240 has upper and lower long sides 240a and right and left short sides 240b. An angle between an extension direction of the long side 240a of the liquid crystal display panel 240 and an extension direction of the light collecting structure of the first light collecting sheet is an acute angle. Therefore, a cycle of a moire stripe between a pattern of the light collecting structure and a pattern of sub-pixels parallel with the long sides 240a of the liquid crystal display apparatus 200 is decreased. Thus, moire stripes cannot be recognized with the naked eye.

Further, the liquid crystal display panel 240 has the sub-pixel region PXL2 formed into a rectangular shape. The rectangular sub-pixel region PXL2 is defined by the scan line SL and the data line DL. An extension direction of the scan line SL is parallel with the extension direction of the long side 240a of the liquid crystal display panel 240. In FIG. 5, the data line DL does not have a bent ("<") shape, but has a shape parallel with a line orthogonal to the scan line SL. An extension direction of the data line DL is parallel with an extension direction of the short side 240b of the liquid crystal display panel 240.

An angle between the extension direction of the long side 240a of the liquid crystal display apparatus 200 and the extension direction of the light collecting structure of the first light collecting sheet is determined to be an angle at which a moire stripe is not recognized in the liquid crystal display apparatus 200. For example, the top line 272b as a line along the extension direction of the light collecting structure of the first light collecting sheet is inclined as much as θ4 with respect to the scan line SL. θ4 may be in the range of 4 degrees to 86 degrees. Even when the sub-pixel region PXL2 has a rectangular shape, θ4 may be increased in order to decrease a cycle of moire stripes. If the cycle of moire stripes is sufficiently decreased, moire stripes may not be recognized with the naked eye.

An angle between the extension direction of the light collecting structure of the first light collecting sheet and the extension direction of the line may be limited depending on the extension direction of the line in the liquid crystal display panel 240. For example, if the scan line SL is formed into a zigzag shape, the extension direction of the light collecting structures of the first light collecting sheet and the second light collecting sheet may be determined to have an angle of 4 degrees or more with respect to any extension direction of the scan line SL.

In the liquid crystal display apparatus 200 according to another exemplary embodiment of the present disclosure, even if the sub-patterns have various patterns as illustrated in FIG. 5, the light collecting structures of the first light collecting sheet and the second light collecting sheet are disposed to be inclined with respect to a pattern of the sub-pixels. Thus, it is possible to minimize a moire pattern recognized due to the sub-pixels and the light collecting structures.

Figure 6:
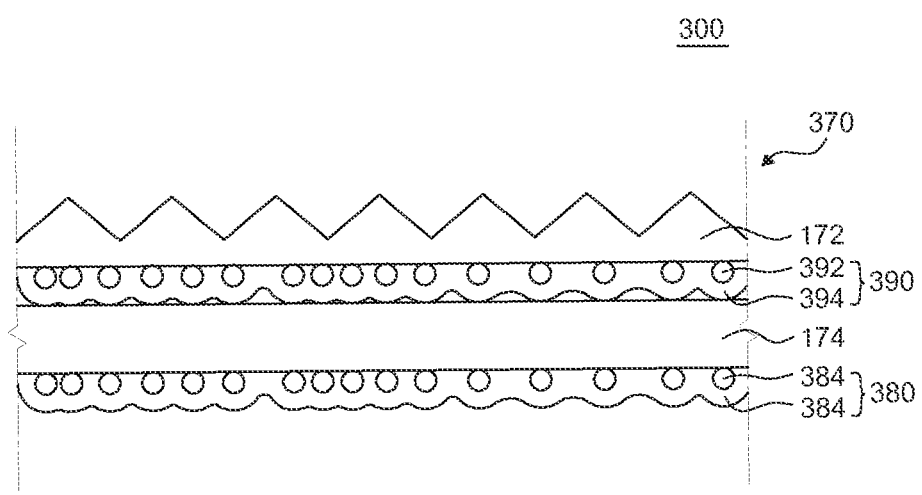
FIG. 6 is a schematic cross-sectional view provided to explain a light collecting layer of a liquid crystal display apparatus according to yet another exemplary embodiment of the present disclosure.

FIG. 6 is a schematic cross-sectional view provided to explain a light collecting layer of a liquid crystal display apparatus according to yet another exemplary embodiment of the present disclosure. Referring to FIG. 6, a light collecting layer of a liquid crystal display apparatus 300 includes the first light collecting sheet 172, the second light collecting sheet 174, a first scattering layer 380, and a second scattering layer 390. The other components are substantially the same as illustrated in FIG. 1 and FIG. 2. Therefore, a redundant description thereof will be omitted.

The first scattering layer 380 is disposed under the second light collecting sheet 174, and the second scattering layer 390 is disposed between the first light collecting sheet 172 and the second light collecting sheet 174. The first scattering layer 380 and the second scattering layer 390 include a plurality of scattering particles 382 and 392. The plurality of scattering particles 382 and 392 are fixed to the upper light collecting sheets by adhesive layers 384 and 394.

If a light from a light guide plate is incident into the plurality of scattering particles 382 and 392, the light is refracted in various random directions toward the liquid crystal display panel. Therefore, a light is incident into the liquid crystal display panel not only from a direction perpendicular to the liquid crystal display panel but also from various directions. Therefore, a pattern caused by the light collecting structures of the first light collecting sheet 172 and the second light collecting sheet 174 is more dimly seen. Since the pattern of the light collecting structures is dimly seen, moire stripes generated when a pattern caused by the lines of the liquid crystal display panel and the pattern of the light collecting structures are overlapped may be less easily recognized. The first scattering layer 380 and the second scattering layer 390 may be configured to have a haze of 90% or more in the light collecting layer. The first scattering layer 380 and the second scattering layer 390 may include a high concentration of the scattering particles 382 and 392 in order to have a haze of 90% or more.

The following Table 2 shows a level of moire stripes caused by an extension direction of the light collecting structures. Further, an extension direction of lines when a light scattering layer is included or not included in a light collecting layer. Levels of recognition of moire stripes of the liquid crystal display apparatus 300 without a scattering layer were measured under the same condition as given in Table 1. Further, levels of recognition of moire stripes of the liquid crystal display apparatus 300 including a scattering layer were measured under the same condition except that the scattering layer is included.

TABLE 2

| Angle (Degree) | Level of recognition of moire stripes of liquid crystal display apparatus without scattering layer | Level of recognition of moire stripes of liquid crystal display apparatus including scattering layer |
| --- | --- | --- |
| 0 | 10 | 9 |
| 2 | 8 | 7 |
| 4 | 5 | 4 |
| 6 | 3 | 2 |
| 8 | 1 | 0 |
| 10 | 0 | 0 |
| 12 | 0 | 0 |

The levels of recognition of moire stripes depending on a degree were similar regardless of whether the scattering layer is included or not. However, when the scattering layer is included, the level of recognition of moire stripes of the liquid crystal display apparatus 300 is further decreased by 1.

FIG. 6 illustrates that the scattering particles 382 and 392 of the first scattering layer 380 and the second scattering layer 390 are randomly dispersed. However, the scattering particles 382 and 392 may be disposed to be concentrated on a specific portion of the light collecting structures of the first light collecting sheet 172 and the second light collecting sheet 174—for example, on a top portion of a prism shape. If the scattering particles 382 and 392 are disposed in such a way as to be concentrated on the top portion of the prism shape, it is possible to secure an value sufficient to lower a level of recognition of moire stripes even with fewer scattering particles 382 and 392.

Although FIG. 6 illustrates that the light collecting layer includes both the first scattering layer 380 and the second scattering layer 390, the light collecting layer may include only one of the first scattering layer 380 and the second scattering layer 390. In the liquid crystal display apparatus 300 according to yet another exemplary embodiment of the present disclosure, if the light collecting layer has a sufficient haze and moire stripes of the liquid crystal display apparatus 300 are less recognized, only one scattering layer may be used.

In the liquid crystal display apparatus 300 according to yet another exemplary embodiment of the present disclosure, as illustrated in FIG. 6, the light collecting layer further includes the scattering layers 380 and 390. Thus, a regular grid array of the light collecting structures of the first light collecting sheet 172 and the second light collecting sheet 174 can be relieved. Therefore, interference between the pixel array and the grid array can be further reduced. Further, the light collecting structures of the first light collecting sheet 172 and the second light collecting sheet 174 are dimly seen, so that a level of recognition of moire stripes can be lowered. Thus, the quality of an image displayed on the liquid crystal display apparatus 300 can be improved.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A liquid crystal display apparatus comprising:
a liquid crystal display panel including pixels defined by a plurality of lines crossing each other; and
a light collecting layer configured to collect light from a backlight in a direction toward the liquid crystal display panel and including a prism mountain aligned in a grid array,
wherein an angle between an extension direction of the prism mountain aligned in a grid array and an extension direction of each of the plurality of lines is determined to be an angle at which a moire phenomenon caused by a repeated pattern of the pixels is not recognized, and
wherein the light collecting layer includes a plurality of light collecting sheets, and
an extension direction of a prism mountain of one of the plurality of light collecting sheets is perpendicular to an extension direction of a prism mountain of another one of the plurality of light collecting sheets.

2. The liquid crystal display apparatus according to claim 1, wherein the extension direction of the prism mountain aligned in a grid array is inclined with respect to the extension direction of each of the plurality of lines.

3. The liquid crystal display apparatus according to claim 2, wherein the plurality of lines includes a scan line and a data line that define a pixel, and
an angle between an extension direction of the scan line and the extension direction of the prism mountain aligned in a grid array and an angle between an extension direction of the data line and the extension direction of the prism mountain aligned in a grid array are in the range of 4 degrees to 12 degrees or 94 degrees to 102 degrees, respectively.

4. A liquid crystal display apparatus comprising:
a backlight;
a liquid crystal display panel including a scan line and a data line crossing the scan line; and
a light collecting layer configured to refract the lights from the backlight in a direction toward the liquid crystal display panel,
wherein the light collecting layer includes:
a first light collecting sheet having a plurality of light collecting structures extended in a first direction; and
a second light collecting sheet on the first light collecting sheet and having a plurality of light collecting structures extended in a second direction orthogonal to the first direction, and
the first direction is inclined with respect to an extension direction of the scan line, wherein an angle between the first direction and the extension direction of the scan line is in the range of 4 degrees to 12 degrees or 94 degrees to 102 degrees.

5. The liquid crystal display apparatus according to claim 4, wherein the second direction is inclined with respect to an extension direction of the data line.

6. The liquid crystal display apparatus according to claim 5, wherein the extension direction of the data line is inclined with respect to the extension direction of the scan line.

7. The liquid crystal display apparatus according to claim 5, wherein an angle between the second direction and the extension direction of the data line is in the range of 4 degrees to 12 degrees or 94 degrees to 102 degrees.

8. The liquid crystal display apparatus according to claim 4, wherein the plurality of light collecting structures has a triangular prism structure in a cross-sectional view.

9. The liquid crystal display apparatus according to claim 4, wherein the plurality of light collecting structures of the first light collecting sheet and the plurality of light collecting structures of the second light collecting sheet are orthogonal to each other.

10. The liquid crystal display apparatus according to claim 4, wherein the light collecting layer further includes a scattering layer between the first light collecting sheet and the second light collecting sheet or on the first light collecting sheet or under the second light collecting sheet.

11. The liquid crystal display apparatus according to claim 10, wherein the scattering layer includes a plurality of scattering particles.

12. The liquid crystal display apparatus according to claim 10, wherein the scattering layer of the light collecting layer is configured to have a haze of 90% or more.

13. A liquid crystal display apparatus comprising:
a liquid crystal display panel including a plurality of lines and pixels; and
a light collecting layer configured to collect lights from a backlight in a direction toward the liquid crystal display panel and including a prism mountain aligned in a grid array,
wherein the prism mountain has a shape extended in a direction in which the pixel array is not matched to the grid array, wherein the prism mountain aligned in a grid array is extended in a direction inclined with respect to an extension direction of the plurality of lines to reduce interference between the pixel array and the grid array, and wherein the light collecting layer includes a plurality of light collecting sheets, and grid arrays of a plurality of prism mountains included in the plurality of light collecting sheets are orthogonal to each other.

14. The liquid crystal display apparatus according to claim 13, wherein the light collecting layer further includes a scattering layer to further reduce interference between the pixel array and the grid array by relieving a regular grid array of the prism mountain.

* * * * *